F. R. PETERSON.
BRAKE ATTACHMENT FOR AUTOMOBILES.
APPLICATION FILED NOV. 22, 1919.

1,389,159.

Patented Aug. 30, 1921.

WITNESSES

INVENTOR
Frederick Reynold Peterson
BY
ATTORNEYS

UNITED STATES PATENT OFFICE.

FREDERICK REYNOLD PETERSON, OF SPOKANE, WASHINGTON.

BRAKE ATTACHMENT FOR AUTOMOBILES.

1,389,159. Specification of Letters Patent. Patented Aug. 30, 1921.

Application filed November 22, 1919. Serial No. 339,880.

*To all whom it may concern:*

Be it known that I, FREDERICK REYNOLD PETERSON, a citizen of the United States, and a resident of Spokane, in the county of Spokane and State of Washington, have invented certain new and useful Improvements in Brake Attachments for Automobiles, of which the following is a specification.

My invention relates to improvements in brake mechanism and has reference more particularly to special attachments to connect the service brake pedal of a Ford automobile with the clutch operating arm of the usual transverse controller shaft, which is usually operated by a hand lever and which also acts to apply the emergency brakes located in the drums of the rear wheels.

It has been learned by actual experience that from various causes, the emergency brake drums are not effective enough to hold the car under various conditions. Acting on this knowledge it has been the practice of some drivers to block the front wheels while cranking the car on cold mornings to prevent it from running over them.

The main object of my invention is to overcome the difficulty above outlined, and to this end I have devised the present invention by means of which the service brake will be applied when the hand lever of the controller shaft is drawn rearwardly to throw the clutch out.

Figure 1:
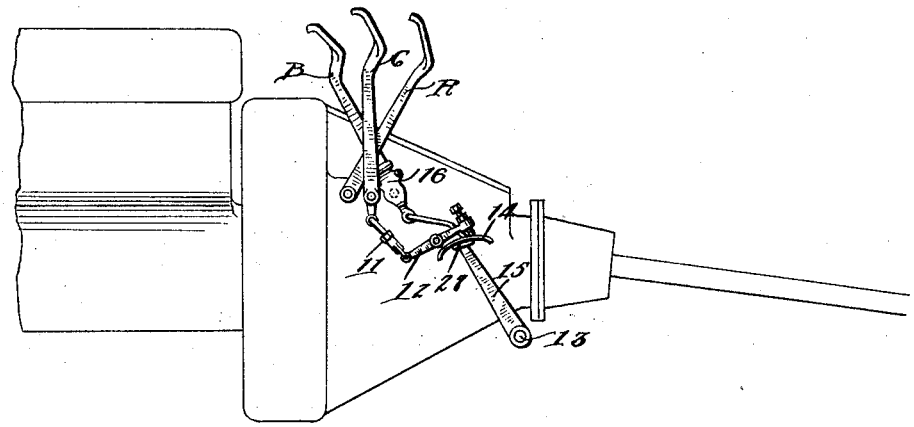

With the above and other objects in view my invention consists in certain novel features of construction, arrangement and combination of parts as will be hereinafter fully described, and pointed out in the claim, reference being had to the drawing in which, Figure 1 is a side elevation of the transmission housing of a Ford automobile, showing my invention as applied thereto.

Figure 2:
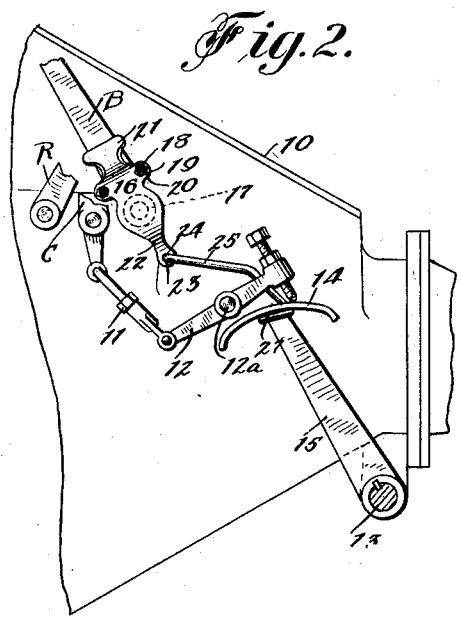
Figure 3:
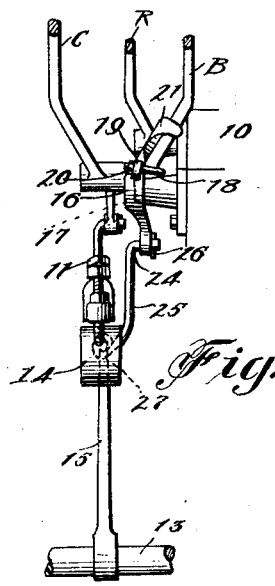

Fig. 2 is a similar view enlarged, with parts broken away to show details of construction, and, Fig. 3 is a front elevation with various pedals in section.

Referring more particularly to the drawings 10 indicates the transmission housing of a Ford automobile C the clutch pedal R the reverse pedal, and B the service or transmission brake pedal.

The clutch pedal C is connected by the usual link 11 with the rocker arm 12 of the clutch controlling shaft 13, said rocker arm coöperating with the cam 14 on the upwardly extending crank arm 15 of the said controlling shaft 13. This shaft 13 is provided as usual with depending crank arms which are usually connected with the brake rods which lead to the emergency brakes within the drums of the rear wheels, and said shaft is also equipped with a hand lever by means of which it may be rocked. The parts just described being of the usual and well-known type are not shown. Their operation is also well-known, the hand lever serving through the medium of the parts 15, 14, 12 and 13 to throw the clutch out and to also apply the emergency brakes when the said hand lever is pulled rearwardly.

As before stated, however, the emergency brake does not prove effective under various conditions, the nature of my invention overcomes this by automatically depressing the service brake pedal B when the before-mentioned hand lever is pulled rearwardly.

The attachments which constitute my invention include a casting 16 having a socket 17 in one side which fits on to the end of the brake pedal B and is clamped thereto by the clevis or U bolt 18, which embracing the brake pedal passes through the side ears 19 and is rigidly held by the nuts 20 screwed on the ends of the clevis or U bolt and against the said ears.

The casting, it will be noted, from the socketed portion extends upwardly and laterally in an oblique direction coinciding with the direction of the brake pedal lever and against which it lies closely, the upper end having the bent claws or fingers 21 which fit on either side of the pedal lever B and which prevent any lost motion between the casting and the pedal lever B.

The lower end 22 of the casting is offset laterally below the socket or toward the housing, the offset being to permit the free movement of the upper part of link 11.

The lower end part 22 is provided with an eye 23 in which one end 24 of rod 25 is pivotally held by a cotter key 26 the rod then extending rearwardly over the clutch lever shaft 12$^a$ and being then bent downwardly and then laterally into an open loop 27 which hooks on to the upper end of crank arm 15 when emergency brake lever is pulled back to apply brake, because emergency brake lever (as before mentioned) is fastened to controller shaft 13, as is also crank arm 15.

When in use my attachment may serve to apply the service brake when the usual hand lever is pulled rearwardly to throw the clutch out and thus lock the car while standing.

The principal purpose of the attachment, however, is to make the service brake serve both as a service brake and as an emergency brake, thereby making it possible, if one wishes, to do away entirely with the usual emergency brake on the rear wheels, and their connections up to the controller shaft.

I claim:—

In an automobile brake mechanism, in combination, a service brake foot pedal, a transverse rocking controller shaft in the rear of said pedal, a speed crank arm on said shaft, and connecting means between the lower end of said pedal and said crank arm, said means comprising a casting including a waist portion having a transverse socket by which it is pivotally mounted on one end of the aforesaid pedal shaft, an upper arm extending from said waist portion in a plane oblique to the longitudinal axis of said casting and against said pedal lever, perforated lugs extending from the opposite edges of the waist portion, a U bolt embracing said pedal lever and adjustably connected at its free ends with said perforated lugs, said upper arm having adjacent its upper end rearwardly bent claws projecting from its opposite edges and engaging the side edges of said pedal lever to prevent lost motion between said arm and pedal lever, a lower arm projecting from the waist portion below the socket, and offset laterally with respect to the longitudinal axis of the casting, said lower arm terminating in an eye or transverse opening, and a link connecting said eye with the aforementioned crank arm, said link comprising a rod having longitudinally bent body portion, a lateral extension at its upper end removably held in said eye, the lower portion of said link offset laterally and terminating in a loop slidably engaging the crank arm below the usual cam carried at the end thereof.

FREDERICK REYNOLD PETERSON.